Oct. 28, 1947.  L. SPRARAGEN  2,429,901

INSTRUMENT CONTROL ADAPTER

Filed May 18, 1944

INVENTOR
Louis Spraragen
BY
ATTORNEYS

Patented Oct. 28, 1947

2,429,901

UNITED STATES PATENT OFFICE 2,429,901

INSTRUMENT CONTROL ADAPTER

Louis Spraragen, Bridgeport, Conn., assignor to Automatic Locking Devices, Incorporated, Bridgeport, Conn., a corporation of Connecticut Application May 18, 1944, Serial No. 536,127

15 Claims. (Cl. 192—8)

This invention relates to operating and locking devices for equipment controlled by rotatable shafts and the like, and more particularly to a unitary device which may be applied as an attachment to equipment already in use, to operate and lock the rotatable shafts thereof.

Electrical and radio equipment at the present time is finding wide use in situations where adverse conditions are met, involving jarring, vibration, rough handling, tampering, etc. These conditions are apt to disturb the adjusted settings of the various instruments in the equipment, resulting in inconvenience, delay, and general impairment of performance which in certain situations might result in considerable loss of both property and life. A device employed heretofore to minimize the effect of some of these adverse conditions, namely rough handling and tampering, has been what is termed the "screwdriver control," wherein the operating shafts of the instruments may terminate flush with the instrument panel, or project but slightly from same, and be fitted with a groove for receiving the tip of a screw driver for operation thereby. This arrangement is generally in use where instruments need be adjusted but infrequently, or where it is desired to reduce the likelihood of inadvertent disturbing of settings resulting from brushing past a knob or dial, or to minimize the likelihood of surreptitious tampering with adjustments, and has proved generally satisfactory in accomplishing these but still does not meet the problem of disturbed settings due to vibration, jarring and the like.

It is an object of the present invention to obviate the above difficulties by providing an operating and locking unit having the advantages of screw-driver control, which may be quickly and conveniently attached to existing equipment having instruments of the screw-driver control type so that the various adjustments of the instruments may be quickly made, and the instruments automatically securely locked to insure proper, consistent functioning under severe, exacting conditions of use, especially in air, land, and water craft.

This is accomplished by the provision of a unit adapted to be mounted on the instrument panel to cover the operating shaft of the instrument, the unit having a screw driver controlled operable member and a driving connection between same and the instrument shaft, there being automatically operative locking means associated with the driving connection and mounting for the unit to lock the shaft, and release means controlled by the operable member so that in one motion the shaft may be unlocked and turned in response to turning of the operable member by a screw driver. The arrangement is such that when the screwdriver-applied turning force is removed from the operable member, the lock automatically becomes operative so that the instrument shaft is held securely in its new adjusted position.

In the form of the invention illustrated herein, the mounting for the unit comprises a body having a pair of oppositely extending apertured ears which may be secured to the panel by the screws which mount the instrument, and to simplify the installation the apertures in the ears may be made in the form of oppositely extending slots so that the screws need be merely loosened and not removed to interpose and secure the mounting ears. Also, the driving connection between the operable member and the instrument shaft is constructed with a bit-like projection which may be quickly inserted in the slot of the shaft without fitting or other operations, and therefore the entire unit may be quickly installed on equipment now in use, generally by employing only a screw driver.

In the specific form of the invention shown, the locking means has separate wedges or parts each of which unidirectionally locks the shaft in a direction opposite to that of the other, the release means selecting one or the other of the wedges for release according to the direction in which the operable member is turned. By this arrangement the unit may be extremely compact and small in size, so that it will not project any considerable distance from the instrument panel, nor occupy much space laterally of the instrument shaft.

Other features and advantages of the invention will hereinafter appear.

In the accompanying drawings—

Figure 3:
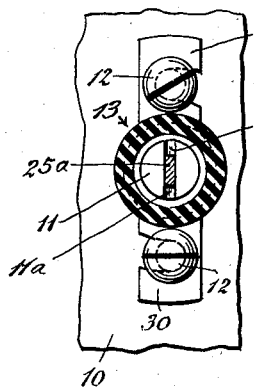
Fig. 3 is a section taken on the line 3—3 of Fig. 1.
Figure 1:
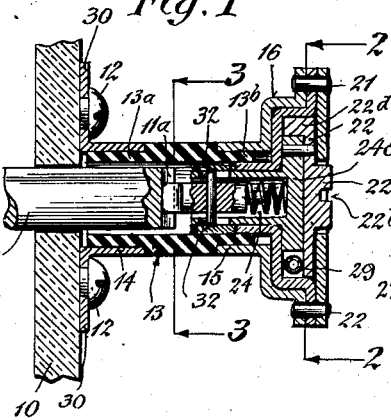
Figure 1 is an axial sectional view showing the unitary operating and locking device mounted on an instrument panel over the end of a shaft, for controlling same.
Figure 2:
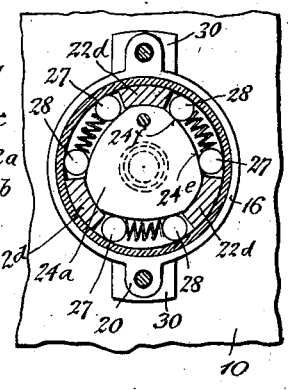
Fig. 2 is a section taken on the line 2—2 of Fig. 1.

As shown in Figs. 1 through 3, the device of this invention is mounted on the front of a panel 10 at the point where the end portion of a control shaft 11 extends through the panel, the shaft controlling an instrument (not shown) which may be mounted on the rear of the panel by screws 12. The operating shaft 11 for the instrument is illustrated as being of the type adapted for screw-driver control, having its projecting end provided with a diametric kerf or groove 11a for receiving the end of a screw driver to be operated thereby. The shaft may project an extent from the front of the panel 10 as shown, or it may fit flush with the panel surface to suit particular conditions where this is desirable.

Shafts adapted for screw-driver control, such as the shaft 11, are generally employed where only infrequent adjustment of the instruments are necessary, and the advantages of this type of control are that tampering with the instrument settings is largely prevented. Also, the danger of disturbing instrument settings as a result of an accidental blow to an operating knob or dial is minimized.

According to the present invention the unitary device mounted on the instrument panel 10 is adapted to have a driving connection with the shaft 11, and is arranged to conveniently operate and automatically lock same, the device retaining the advantages of screw-driver control while at the same time positively providing against inadvertent disturbance of the adjusted settings of the shaft and instrument controlled thereby such as might result from jarring, vibrations, rough handling and the like. This device is so arranged that it may be quickly and conveniently attached to existing instrument panels without time consuming alterations thereto, and requires but a moderate amount of additional space when installed.

Figure 4:
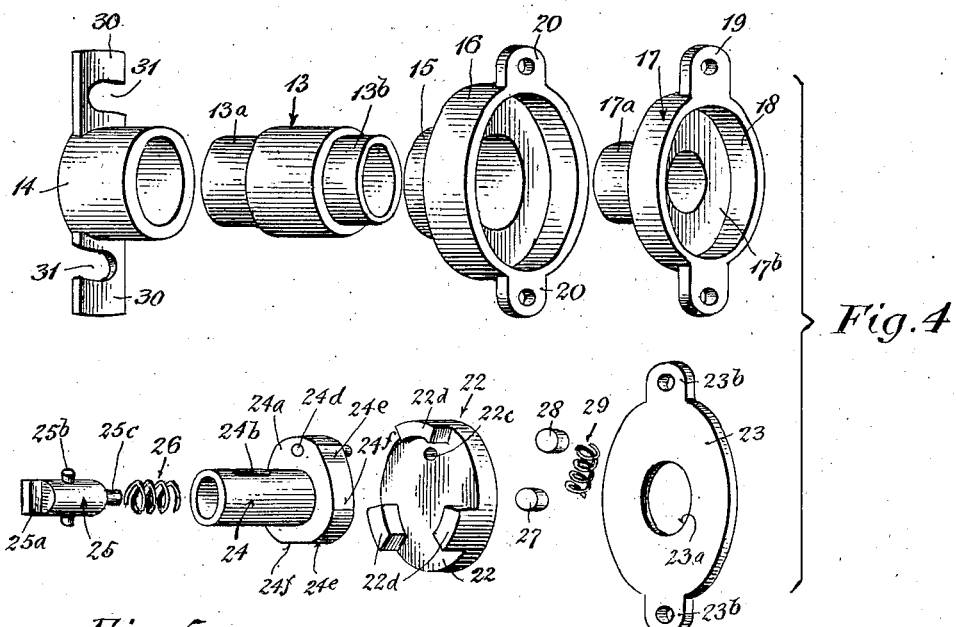
Fig. 4 is an exploded view of the device.
Figure 5:
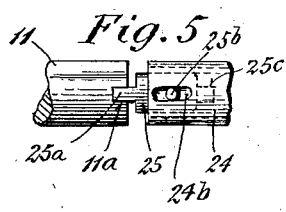
Fig. 5 is a fragmentary detail showing the driving connection between the device and the end of the shaft it controls.

As shown in Figs. 1 and 4, this device comprises a support or body 13 which may be made of tubular insulating material such as Bakelite tubing or the like, encompassing the end of the shaft 11, the body having an end portion 13a of reduced diameter which may be press-fitted into a sleeve 14 which is rigidly attached to the panel 10. The other end 13b of the body is also of reduced diameter, being press-fitted into a sleeve 15 attached to a housing 16 which latter is adapted to enclose the operating and locking mechanism of the unit.

This mechanism comprises a cylindrical drum 17 having a bore 18, the drum being carried within the housing 16 and both these parts having aligned pairs of apertured ears 19 and 20 respectively, receiving rivets 21 by means of which they are secured together. The operable member of the mechanism comprises a disk 22 which is carried within the bore 18 of the drum, the disk having a central boss 22a provided with a screw driver slot 22b by means of which the disk may be turned.

According to the invention a driving and locking connection is provided within the body 13 and housing 16 between the disk 22 and the slotted end of the shaft 11 so that the latter may be driven when turning force is applied to the disk, and so that it may be automatically locked upon removal of the turning force. For this purpose, the drum 17 is provided with a bearing sleeve 17a adapted to extend into the end portion 13b of the body 13. Rotatably mounted within the sleeve 17a is a tubular link or connecting shaft 24, one end of which has an external flange 24a engaging the side wall 17b of the drum, the other end of the shaft being open and slidably carrying a coupling 25 having a diametric end projection or bit 25a extending into the slot 11a of the shaft 11, and closely fitting same. The coupling 25 is keyed to the shaft 24 by means of a diametrically located pin 25b it carries, the ends of which extend into a pair of longitudinal slots 24b in the walls of the shaft.

For the purpose of yieldably holding the coupling 25 in extended position where the projection 25a thereof is firmly engaged in the groove 11a of the shaft 11, a helical compression spring 26 is located within the tubular shaft 24, one end of the spring engaging a closure 24c and the other end engaging the coupling, and preferably the latter is provided with an axial pin 25c to extend into the spring 26 for centralizing same.

The connection to the shaft 11 as provided by this construction permits the unit to be quickly coupled to the shaft without resorting to binding screws and the like, and is especially advantageous where instrument shafts are short or flush with the panel face.

A driving connection between the link or shaft 24 and the disk 22 is provided in the form of a pin 24d press-fitted into the flange 24a and extending into an aperture 22c in the disk, the aperture being larger than the pin to provide for lost motion for purposes to be hereinafter brought out.

Retention of the disk 22 in the drum 17 is accomplished by the provision of a circular cover plate 23 having a central aperture 23a through which the boss 22a of the disk may extend, and having a pair of apertured ears 23b aligned with the ears 19 and 20 and secured thereto by means of the rivets 21.

According to this construction, the shaft 11 may be rotated in either direction by inserting a screw driver in the slot 22b of the disk 22 and turning same.

For the purpose of locking the shaft 11 in any adjusted position, the flange 24a of the connecting shaft 24 is provided with a plurality of reliefs on its otherwise cylindrical periphery, each of the reliefs constituting a pair of opposed wedging surfaces 24e and 24f. Pairs of locking rollers 27 and 28 are located between the wedging surfaces 24e, 24f and the bore or track 18 of the drum 17, the rollers of the respective pairs being yieldably held apart by helical compression springs 29, and as shown in Fig. 2, the diameters of the rollers being such with relation to the spacing between the wedging surfaces and the track that the rollers may be tightly wedged between same to lock the flange 24a to the drum 17 against turning in either direction. Thus the setting of the shaft 11 and the instrument controlled thereby may be maintained without disturbance, with respect to the panel 10, since the brake drum 17, housing 16, tubular body 13 and mounting sleeve 14 are all rigid with the panel.

For selectively releasing one or the other of the sets of rollers 27, 28 in response to turning of the disk 22, the latter is provided with a plurality of lugs 22d equi-spaced about its periphery and extending into the spaces between the unrelieved peripheral portions of the flange 24a and the track 18. The lugs are so arranged that they will be centralized between their adjacent rollers when the driving pin 24d of the flange 24a is centralized in the aperture 22c of the disk 22, this arrangement being such that when the disk is moved in one direction or the other to take up the clearance at the pin, one or the other of the sets of rollers will be first dislodged to release the shafts 24 and 11 before the pin is engaged.

Referring to Fig. 2, if the disk 22 and lugs 22d are rotated clockwise, the latter will dislodge the rollers 28 to uni-directionally release the shafts 24 and 11, and upon continuation of this rotation the driving pin 24d will be engaged and the shafts will then rotate with the disk. This rotation is not interfered with by the rollers 27 since these lock the flange only against counterclockwise turning. Upon removal of the turning force from the disk 22, as by removal of the screw driver from the slot 22b thereof, the springs 29 will return the rollers 28 to their wedging positions, thereby automatically again locking the shaft 11, the rollers also moving the lugs 22d and disk 22 to a locking or intermediate position with respect to the flange 24a, wherein the pin 24d is again centralized in the aperture 22c. In a similar manner counterclockwise rotation of the disk 22 and lugs 22d will first dislodge the rollers 27 and then drive the shafts 24 and 11 in a counterclockwise direction, the locking being automatic on removal of the turning force as before.

By this construction the shaft 11 may be adjusted quickly to any desired setting by employing a screw driver in the groove 22b to turn the disk 22, and upon removal of the screw driver the shaft will be automatically securely locked in its adjusted position.

Also according to the invention, provision is made for quickly installing the operating and locking unit with a minimum of inconvenience, and to this end the mounting sleeve 14 is provided with a pair of oppositely extending arms 30 having slots 31 whereby the arms may be interposed between the panel and the heads of the screws 12 by loosening, but not removing the latter.

In carrying out this installation, the screws 12 are first loosened an extent, then the unit is applied to the panel 10 so the body 13 encompasses the shaft 11, with the arms 30 disengaged from the screws. The entire unit is now turned to cause the arms to slide under the heads of the screws, after which the latter may be tightened. Thus the instrumentalities, nuts, etc., carried by the screws 12 at the rear of the panel 10 need not be held in place by an installer as would be the case if it were necessary to remove the screws entirely. According to this arrangement, taken together with the tongue and groove connection between the plunger 25 and the shaft 11, it is possible to very quickly install the operating and locking unit using only a screw driver.

Referring to Fig. 1, when the unit is mounted on the panel 10 to operate and lock the shaft 11, the spring 26 which yieldably holds the plunger 25 in engagement with the end of the shaft 11 will be under compression, the force from the spring being exerted on the tubular shaft or link 24. For the purpose of preventing this force from being transmitted to the disk 22 where it might interfere with the operating movements of the latter, especially when it is being returned to an intermediate locking position by the springs 29 upon removal of the operating screw driver or similar tool from the disk, a thrust collar 32 is press-fitted on the exterior of the shaft 24 to engage the end of the bearing sleeve 11a, so that this latter assumes the force of the spring 26 instead of the disk 22. Thus the disk may be freely movable insofar as any retarding friction caused by the spring 26 is concerned.

Preferably the plunger 25 is sufficiently smaller in diameter than the bore of the link 24 so that clearance exists to enable the plunger to pivot an extent on the pin 25b. This permits the operating and locking unit to be installed without the necessity of perfectly aligning same with the shaft 11, yet a positive driving connection is maintained with the latter for operation and locking.

The spring 26, cooperating with the pin 25c of the plunger, functions to hold the latter in axial alignment for engaging the shaft 11 during installation of the unit.

Variations and modifications may be made within the scope of this invention and portions of the improvements may be used without others.

I claim:

1. Operating and locking means adapted to be mounted as a unit over the end of a rotatable shaft which extends through a panel and has a groove for screw-driver control, comprising a support; means for attaching the support to the instrument panel adjacent the end of the shaft; a link rotatably carried by the support, having means floatingly carried thereby for engaging the groove in the end of the shaft to drive the latter; means for automatically locking the link to the support; an operable member rotatably carried by the support; and means for rendering said locking means inoperative and for turning the link in response to turning of the operable member by an applied force, the locking means becoming again operative upon removal of said applied force from the operable member.

2. Operating and locking means adapted to be mounted as a unit over the end of a rotatable shaft which extends through a panel and has a groove for screw-driver control, comprising a support; means for attaching the support to the instrument panel adjacent the end of the shaft; a link rotatably carried by the support, having means yieldably carried thereby for engaging the groove in the end of the shaft to drive the latter; means for automatically locking the link to the support; an operable member rotatably carried by the support; a lost-motion driving connection between the operable member and the link; and release means for rendering inoperative the locking means to permit turning of the link when the operable member is turned by an applied force to a position having driving engagement with the link, so that continued turning of the operable member will cause said link to turn, said release means operating upon removal of said applied force to return the operable member to a position intermediate its positions of driving engagement.

3. Operating and locking means adapted to be mounted as a unit over the end of a rotatable shaft which extends through a panel and has a groove for screw-driver control, comprising a support; means for attaching the support to the instrument panel adjacent the end of the shaft; a link rotatably carried by the support, having means for yieldably engaging the groove in the end of the shaft to drive the latter; means for automatically locking the link to the support; an operable member rotatable with respect to the link between two limits, and having a positive connection at said limits to drive the link; and means for releasing the locking means when the operable member is turned to one of said limits so that further turning of the member causes the link to turn, said locking means automatically becoming operative again when the knob is released.

4. The invention as defined in claim 3, in which there are means for yieldably holding the operable member in a position intermediate said limits so that the locking means are operative when no force is being applied to the said member.

5. Operating and locking means adapted to be mounted as a unit over the end of a rotatable shaft which extends through a panel and has a groove for screw-driver control, comprising a support; means for attaching the support to the instrument panel adjacent the end of the shaft; a link rotatably carried by the support, having yieldably mounted means for engaging the groove in the end of the shaft to drive the latter; means for automatically locking the link to the support against turning in solely one direction; means for automatically locking the link to the support against turning solely in the other direction; and means for rendering inoperative one or the other of said locking means and for turning the link in one direction or the other respectively in response to turning of the operable member in said one direction or the other by an applied force, the locking means automatically becoming again operative upon removal of said force from the operable member.

6. Operating and locking means adapted to be mounted as a unit over the end of a rotatable shaft which extends through a panel and has a groove for screw-driver control, comprising a support; means for attaching the support to the instrument panel adjacent the end of the shaft; a locking drum rigid on the support, having an internal cylindrical surface; a link rotatably carried by the support, having floatable means for engaging the groove in the end of the shaft to drive the latter, and having a fixed flange located within the locking drum, said flange having a wedging surface spaced from and approaching the cylindrical surface of the drum; a wedging means and means for yieldably holding same in wedging engagement with the surfaces of the drum and flange to prevent turning of the latter and the link; and an operable member rotatably mounted on the support, having a lug extending between the surfaces of the drum and flange for engagement with the wedging roller, and having a lost-motion driving connection with the link so that when force is applied to cause turning of the member in one direction it will first move the wedging means out of wedging position to unlock the flange and link from the drum, and then drive same as the turning is continued, the wedging means being automatically moved to wedging position again by said yielding means to lock the flange and link upon removal of the turning force from the operable member.

7. The invention as defined in claim 2, in which the lost-motion driving connection between the operable member and link comprises a pin associated with one of said parts, and a recess loosely receiving said pin, associated with the other part.

8. Operating and locking means to be mounted as a unit over the end of a rotatable shaft which extends through a panel and has a groove for screw-driver control, comprising a support; means for attaching the support to the instrument panel adjacent the end of the shaft; a link rotatably carried by the support, said link comprising a pair of telescoping members keyed against relative turning and having relative axial movement, one member being adapted for locking to the support and the other having a projection for extending into the groove of the shaft when the unit is mounted over same, and spring means for urging the members apart so that the said projection will be yieldably held in engagement with the shaft when the unit is mounted; means for automatically locking the link to the support; an operable member rotatably carried by the support; and means for rendering said locking means inoperative and for turning the link in response to turning of the operable member by an applied force, the locking means becoming again operative upon removal of said applied force from the operable member.

9. Operating and locking means to be mounted as a unit over the end of a rotatable shaft which extends through a panel and has a groove for screw-driver control, comprising a support; means for attaching the support to the instrument panel adjacent the end of the shaft; a link rotatably carried by the support, having means comprising a bit slidably received in the groove in the end of the shaft to drive the latter; means for automatically locking the link to the support; an operable member rotatably carried by the support; and means for rendering said locking means inoperative and for turning the link in response to turning of the operable member by an applied force, the locking means becoming again operative upon removal of said applied force from the operable member, said means for attaching the support to the instrument panel including a member shaped to be received under the head of a screw carried by the panel upon loosening the screw an extent and without removing same from the panel, so that installation of the unit may be accomplished with a minimum of time.

10. Operating and locking means to be mounted as a unit over the end of a rotatable shaft which extends through a panel and has a groove for screw-driver control, comprising a tubular support, adapted to encompass the end portion of the shaft; means for attaching the support to the instrument panel adjacent the end of the shaft; a link rotatably carried within the support, having means including a bit adapted to be slidably received in the groove; means for automatically locking the link to the support; an operable member rotatably carried by the support; and means for rendering said locking means inoperative and for turning the link in response to turning of the operable member by an applied force, the locking means becoming again operative upon removal of said applied force from the operable member, said means for attaching the support to the instrument panel including a pair of flat oppositely radially extending arms attached to the support and located to lie flat against the panel when the unit is mounted thereon, the arms having slots extending in opposite directions substantially perpendicularly to a common radial line thereof so that when the support is placed over the end portion of the shaft and turned the arms will move along the panel surface for positioning under the heads of aligned screws carried by the latter and which have previously been loosened.

11. Operating and locking means adapted to be mounted as a unit over the end of a rotatable shaft which extends through a panel and has a screw-driver slot, comprising a tubular support; means for attaching one end of the support to the instrument panel to encompass the end portion of the shaft; a locking drum rigidly mounted on the other end of the support, having an internal cylindrical surface; a link rotatably carried in the support, having a flange located within the locking drum, said flange having a pair of oppositely directed wedging surfaces spaced from and approaching the cylindrical surface of the drum; wedges located between the said surfaces of the flange and drum; means for yieldably holding the wedges in position to lock the flange to the drum; a disk rotatably mounted in the drum adjacent the said flange and having a groove exposed to receive the end of a screw driver for driving the disk; a pair of lugs on the disk extending between the said surfaces of the drum and flange for engaging the wedges to selectively release them depending on the direction the disk is turned; a lost-motion driving connection between the disk and the link whereby the drum and link is first unlocked and then the latter is turned; and a coupling mounted on the link for axial movement keyed to the latter, and having a bit at its end adapted to extend into the screwdriver slot of the shaft for driving the same.

12. The invention as defined in claim 11, in which the coupling is also pivotally mounted on the link so that it may swing to align the bit with the screw-driver slot on the shaft.

13. The invention as defined in claim 11, in which there is resilient means for yieldingly forcing the bit into the screw-driver slot of the shaft.

14. The invention as defined in claim 11, in which the coupling is also pivotally mounted on the link so that it may swing to align the bit with the screw-driver slot on the shaft, in which there is resilient means for yieldingly forcing the bit into the screw-driver slot of the shaft and for yieldingly holding the bit in centralized position before it enters the slot of the shaft.

15. The invention as defined in claim 11, in which there is a housing carried by the tubular support, enclosing the locking drum and disk, and having an aperture to permit access to the latter for the purpose of turning same.

LOUIS SPRARAGEN.

REFERENCES CITED

The following references are of record in the file of this patent:

UNITED STATES PATENTS

| Number | Name | Date |
| --- | --- | --- |
| Re. 16,565 | Myers | Mar. 1, 1927 |
| 945,909 | Chapman | Jan. 11, 1910 |
| 1,135,731 | Smyser | Apr. 13, 1915 |
| 1,277,800 | Westfall | Sept. 3, 1918 |
| 1,457,694 | Douglas | June 5, 1923 |
| 1,529,248 | Greene et al. | Mar. 10, 1925 |
| 1,889,295 | Rosatelli | Nov. 29, 1932 |
| 1,918,411 | Lowe | July 18, 1933 |
| 2,251,466 | Payson | Aug. 5, 1941 |
| 2,357,152 | Whitted | Aug. 29, 1944 |

FOREIGN PATENTS

| Number | Country | Date |
| --- | --- | --- |
| 20,178 | Great Britain | Sept. 10, 1907 |
| 508,123 | Germany | Sept. 24, 1930 |
| 649,901 | France | Sept. 10, 1928 |